Aug. 18, 1953    W. E. WITHALL    2,649,212
FRICTION SHOCK ABSORBING MECHANISM FOR RAILWAY DRAFT RIGGINGS
Filed April 27, 1949    2 Sheets-Sheet 1

Inventor:
William E. Withall.
By
Henry Fuchs
Atty.

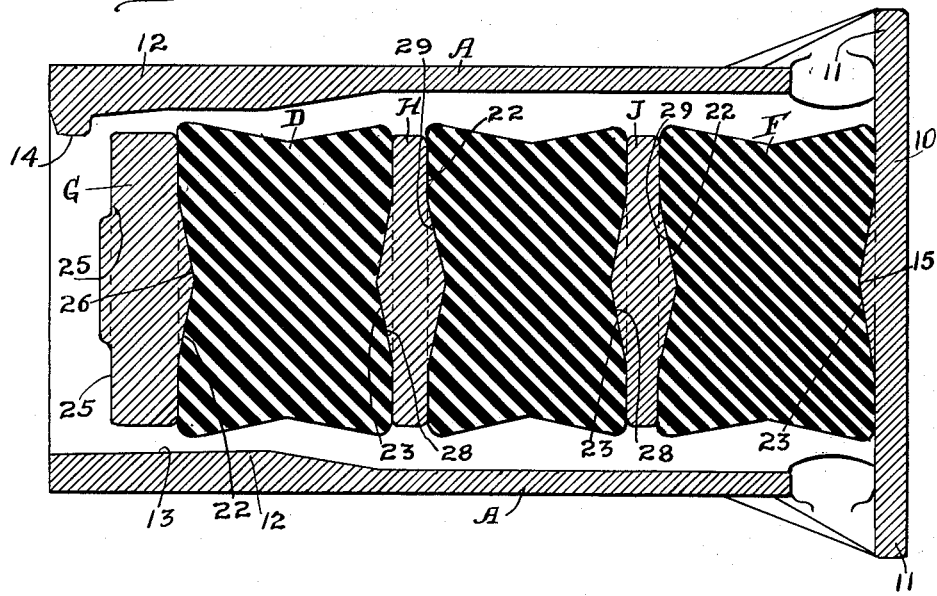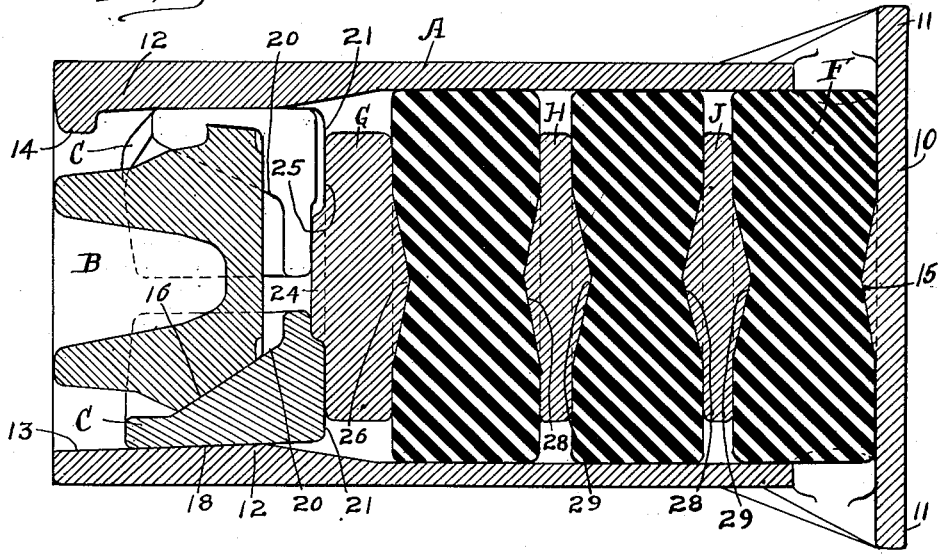

Patented Aug. 18, 1953

2,649,212

UNITED STATES PATENT OFFICE 2,649,212

FRICTION SHOCK ABSORBING MECHANISM FOR RAILWAY DRAFT RIGGINGS

William E. Withall, Hinsdale, Ill., assignor to W. H. Miner, Inc., Chicago, Ill., a corporation of Delaware Application April 27, 1949, Serial No. 89,966

1 Claim. (Cl. 213—45)

This invention relates to improvements in friction shock absorbing mechanisms especially adapted for railway draft riggings.

One object of the invention is to provide a high capacity friction shock absorbing mechanism comprising a friction casing, and a yieldingly resisted friction clutch slidingly telescoped within the casing, wherein the yielding resistance to movement of the clutch comprises a cushioning element composed of a plurality of rubber pads or blocks and rigid spacing members alternated with the pads or blocks.

A more specific object of the invention is to provide a friction shock absorbing mechanism, as set forth in the preceding paragraph, wherein the spacing members are provided with conelike, central projections or bosses, which cooperate with the rubber pads or blocks, to effect proper spreading of the same while being compressed between adjacent said spacing members.

Figure 1:
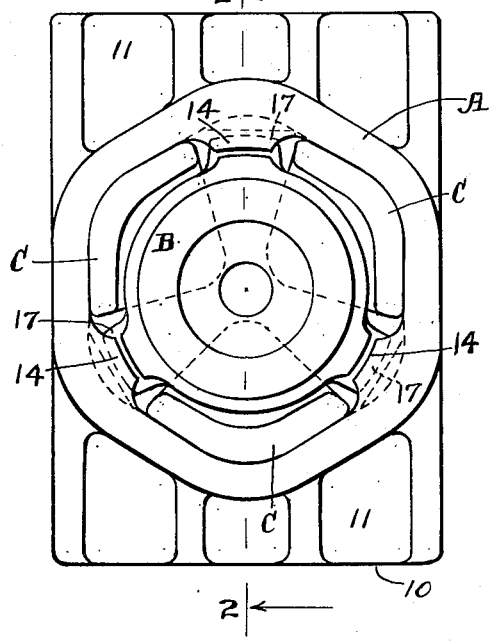
Figure 3:
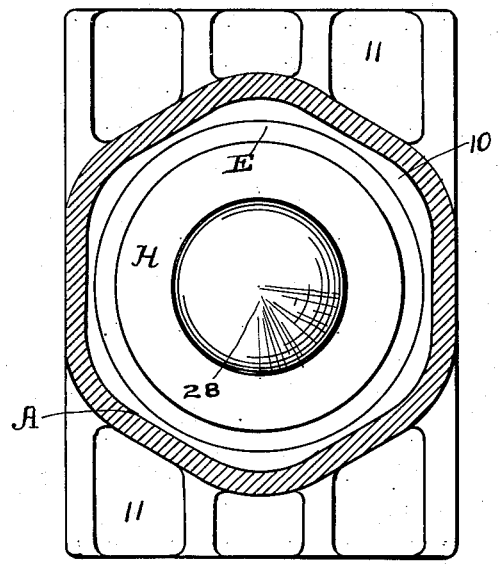
Figure 2:
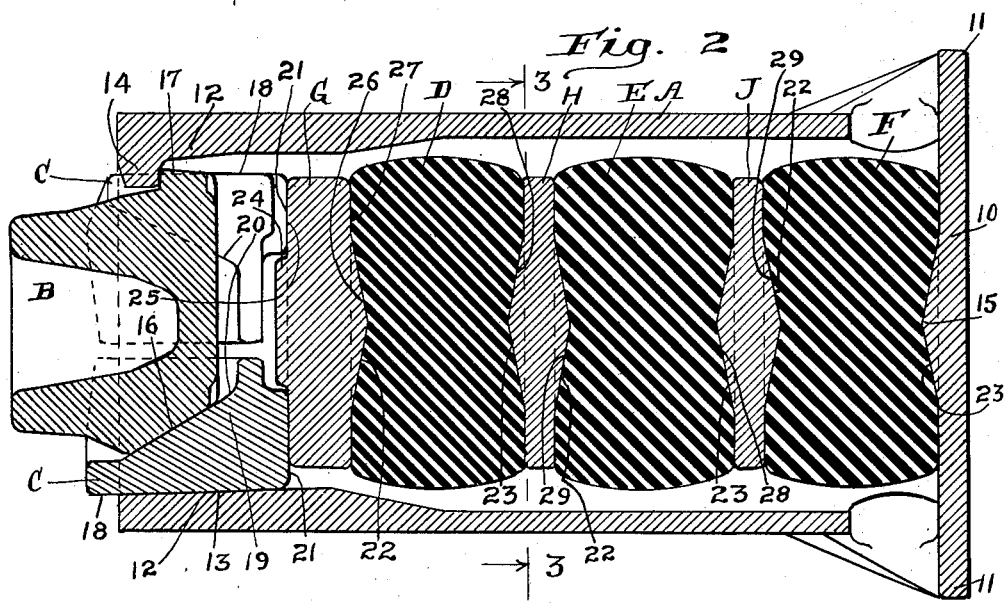

In the accompanying drawings forming a part of this specification, Figure 1 is a front end elevational view of my improved friction shock absorbing mechanism. Figure 2 is a longitudinal, vertical sectional view, corresponding substantially to the line 2—2 of Figure 1. Figure 3 is a transverse, vertical sectional view, corresponding substantially to the line 3—3 of Figure 2. Figure 4 is a view similar to Figure 2, showing the mechanism partly assembled. Figure 5 is a view similar to Figure 2, showing the mechanism fully compressed.

As shown in the drawings, my improved friction shock absorbing mechanism comprises broadly a casing A, a wedge block B, three friction shoes C—C—C, a plurality of rubber pads or blocks D, E, and F, and spacing plates G, H, and J.

The casing A is in the form of a hollow, tubular member, open at its front end and closed at its rear end by a transverse wall 10, which is extended laterally outwardly beyond the sides of the casing to provide a rear follower member 11, which is integral with the casing. The casing is of hexagonal, interior and exterior, transverse cross section, and the walls thereof are thickened at the open end, as indicated at 12. The thickened wall portions of the casing provide the friction shell proper of the mechanism, presenting three inwardly converging friction surfaces 13—13—13 of V-shaped, transverse cross section, each V-shaped surface 13 being formed by the interior faces of two adjacent walls of the hexagonal casing. At the open or outer end, the casing A is provided with three inturned stop lugs 14—14—14, which are alternated with the three friction surfaces 13—13—13, the same being at the corners of the casing between adjacent said V-shaped surfaces. The transverse rear wall 10 of the casing A is provided with an inwardly extending, central boss or projection 15 on its inner side, which is of substantially conical shape.

The wedge B is in the form of a block having a set of three wedge faces 16—16—16 at its inner end, arranged symmetrically about the central, longitudinal axis of the mechanism and converging inwardly. Each wedge face 16 is of V-shaped, transverse cross section. At its inner end, the wedge B also has three laterally outwardly projecting, radial lugs 17—17—17, which are alternated with the wedge faces thereof, as shown in Figure 1. In other words, the lugs 17 are arranged so that they are located between adjacent wedge faces and extend between adjacent shoes C—C to engage in back of the lugs 14 of the casing to restrict outward movement of the wedge block.

The three friction shoes C—C—C surround the wedge block B, being interposed between the wedge faces 16 of the latter and the friction surfaces 13 of the casing.

The three shoes C—C—C are of similar design, each having an outer, longitudinally extending, V-shaped friction surface 18, correspondingly inclined to, and engaged with, one of the V-shaped surfaces 13 of the casing. On its inner side, each shoe is provided with an enlargement 19, having a wedge face 20 of V-shaped, transverse section, engaging one of the V-shaped wedge faces 16 of the block B and correspondingly inclined thereto. The inner ends of the shoes present flat, transverse abutment faces 21 on which the spacing plate G bears.

The rubber pads or blocks D, E, and F are arranged in series, lengthwise of the mechanism, within the friction casing A, between the spacing plate G and the rear wall 10 of said casing. These rubber pads or blocks are in the form of relatively thick, circular discs, which lie transversely of the casing. Each of these pads or blocks, before being compressed between the spacing plates, is of the shape illustrated in Figure 4, the same flaring outwardly at opposite ends and having the front and rear end faces thereof centrally depressed, the depressed parts being of conical contour, thus providing substantially conical seats 22 and 23 at the front and rear ends of said blocks.

The spacing plate G is in the form of a relatively heavy metal disc, bearing on the inner ends of the shoes C—C—C. The plate G has a forwardly projecting, relatively shallow, raised, central boss 24 at its front end, extending into depressions at the rear ends of the shoes. The boss 24 is surrounded by a substantially flat face 25, which bears on the flat end faces 21 of the shoes. On the inner side, the plate G represents a central projection or boss 26 of conical shape, surrounded by a substantially flat surface 27. The rubber pad or block D, which is at the front end of the series, bears directly on the plate G, with the conical boss 26 of said plate engaged in the conical depression or seat 22 at the front end of said block. The rubber pad F, which is at the rear end of the series, bears directly on the end wall 10 of the casing, with the conical boss 15 engaged in the seat 23 at the rear end of said block.

The rubber pad or block E is disposed between the blocks D and F, being the central block of the series. The separator plates H and J are interposed between the block E and the blocks D and F, the plate H being located between the block D and the block E, and the plate J between the block E and the block F. Each plate H and J has front and rear, central, conical projections or bosses 28 and 29, each surrounded by a substantially flat surface. The plate H, at its forward side, bears flatly on the rubber pad or block D, with its conical boss 28 fitting in the conical seat 23 at the rear side of said block. At the rear side, the plate H bears flatly on the rubber block E, with the conical boss 29 of said plate fitting in the conical seat 22 at the front side of said block. The plate J, at its forward side, bears flatly on the pad or block E, with the conical boss 28 fitting in the conical seat 23 at the rear side of said block. At the rear side, the plate J bears flatly on the rubber pad or block F, with the conical boss 29 of said plate fitting in the conical seat 22 at the front side of said block.

The rubber blocks D, E, and F, in uncompressed condition, are of smaller diameter than the interior diameter of the casing A. The spacing plates G, H, and J are also of smaller diameter than the interior diameter of the casing. It will be evident that clearance is thus provided in said casing for diametrical expansion of the rubber blocks, the parts being so proportioned that, when the mechanism is fully compressed, as shown in Figure 5, the blocks take up all this clearance and have full contact with the interior walls of the casing. As shown in Figure 4, which illustrates the parts of the mechanism, with the exception of the wedge B and the friction shoes C—C—C, as assembled with the casing, and the rubber blocks uncompressed, the blocks D, E, and F are of slightly greater diameter than the spacing plates and flare toward opposite ends. With the wedge B and the shoes C—C—C assembled with the other parts and the wedge B locked in position by the stop lugs 14—14—14 of the casing, as shown in Figure 2, the rubber blocks D, E, and F are placed under a predetermined amount of compression in a direction lengthwise of the mechanism, and assume the shapes shown in Figure 2, that is, bulged outwardly between adjacent spacing plates, but still clear of the side walls of the casing.

The operation of my improved shock absorbing mechanism is as follows: Upon the mechanism being compressed by relative approach of the main followers of the draft rigging, the wedge B is forced inwardly or rearwardly of the casing A, thereby setting up a wedging action between the wedge and the friction shoes, spreading the latter apart and forcing the same into tight frictional engagement with the casing friction surfaces while sliding the same inwardly of the casing against the resistance afforded by the rubber blocks D, E, and F. The required frictional resistance is thus provided, which gradually increases during the compression stroke of the mechanism, the resistance building up as the compression of the rubber blocks progresses, the initial cushioning effect of the rubber blocks being relatively soft to take care of the lighter shocks to which the mechanism is subjected in service. As the heavier shocks are encountered, the resistance of the rubber blocks progressively increases as they are spread apart and stretched radially by the wedging action of the conical projections on the spacing plates. Compression of the mechanism is positively limited when the parts reach the position shown in Figure 5, with the outer end of the wedge B flush with the outer end of the casing, in which position the follower of the draft rigging engages the outer end of the casing to transmit the compression forces to the same. In this position of the parts, the rubber blocks have been compressed to an extent to radially expand the same to substantially fill the interior of the casing A, as illustrated in Figure 5.

When the actuating force is reduced, the tenency of the rubber mats or blocks to expand lengthwise of the mechanism, while returning to their normal shape, restores all of the parts to the normal full release position shown in Figure 1, outward movement of the wedge block B being positively limited by engagement of the lugs 17 thereof with the stop lugs 14 of the casing.

I claim:

A shock absorbing unit comprising a plurality of solid rubber blocks arranged in series and a plurality of rigid spacing members alternated with said blocks, said blocks having central, tapered depressions in the front and rear sides thereof surrounded by flat surface portions, and said spacing members having outwardly tapered, central projections seated in the depressions of said blocks and flat surface portions surrounding said projections, said last named flat surface portions bearing on said first named flat surface portions.

WILLIAM E. WITHALL.

References Cited in the file of this patent

UNITED STATES PATENTS

| Number | Name | Date |
|---|---|---|
| 7,706 | Ray | Oct. 8, 1850 |
| 28,619 | Vose | June 5, 1860 |
| 2,260,532 | Lindeman | Oct. 28, 1941 |
| 2,463,373 | Gadbois | Mar. 1, 1949 |

FOREIGN PATENTS

| Number | Country | Date |
|---|---|---|
| 13,951 | Great Britain | Feb. 2, 1852 |
| 727,324 | France | Mar. 22, 1932 |
| 733,478 | France | July 11, 1932 |